United States Patent [19]

Paulsen et al.

[11] Patent Number: 4,650,099
[45] Date of Patent: Mar. 17, 1987

[54] LIQUID DISPENSING GUN

[75] Inventors: Gary Paulsen, Geneva; Lawrence E. Thomas, Carol Stream, both of Ill.

[73] Assignee: Spraying Systems Company, Wheaton, Ill.

[21] Appl. No.: 596,654

[22] Filed: Apr. 4, 1984

[51] Int. Cl.4 .............................................. G01F 11/06
[52] U.S. Cl. .................... 222/263; 222/335; 222/340; 222/449; 137/627.5
[58] Field of Search ............... 222/253, 263, 335, 340, 222/441, 444, 453, 449; 137/627.5

[56] References Cited

U.S. PATENT DOCUMENTS

| 208,645 | 10/1878 | Spencer | 222/444 |
|---|---|---|---|
| 1,979,428 | 11/1934 | Wheeler | 222/335 X |
| 2,605,021 | 7/1952 | Churchill et al. | 222/340 X |
| 2,675,946 | 4/1954 | Strempel | 222/263 X |
| 2,814,422 | 11/1957 | Mercier | 222/335 |
| 3,162,336 | 12/1964 | Erickson | 222/335 X |
| 3,369,706 | 2/1968 | Schnyder | 222/335 |
| 3,790,037 | 2/1974 | Fletcher et al. | 222/444 X |
| 4,006,847 | 2/1977 | Dooley | 222/263 |
| 4,071,046 | 1/1878 | Cates | 137/627.5 X |
| 4,499,921 | 2/1985 | Stoll | 137/596.1 X |

FOREIGN PATENT DOCUMENTS

| 2149544 | 4/1973 | Fed. Rep. of Germany | 222/335 |
|---|---|---|---|
| 15701 | of 1910 | United Kingdom | 222/444 |

Primary Examiner—Charles A. Marmor
Assistant Examiner—Frederick R. Handren
Attorney, Agent, or Firm—Leydig, Voit & Mayer

[57] ABSTRACT

A liquid dispensing gun for repeatedly dispensing precisely metered quantities of liquid from a pressurized source. The gun comprises a hollow body having a valve chamber and a metering chamber connected thereto by a control orifice. An axially slidable valve spool in the valve chamber and a trigger operated actuating plunger serve to govern the reciprocation of a metering piston in the metering chamber and the admission and discharge of metered quantities of liquid to and from the metering chamber.

19 Claims, 4 Drawing Figures

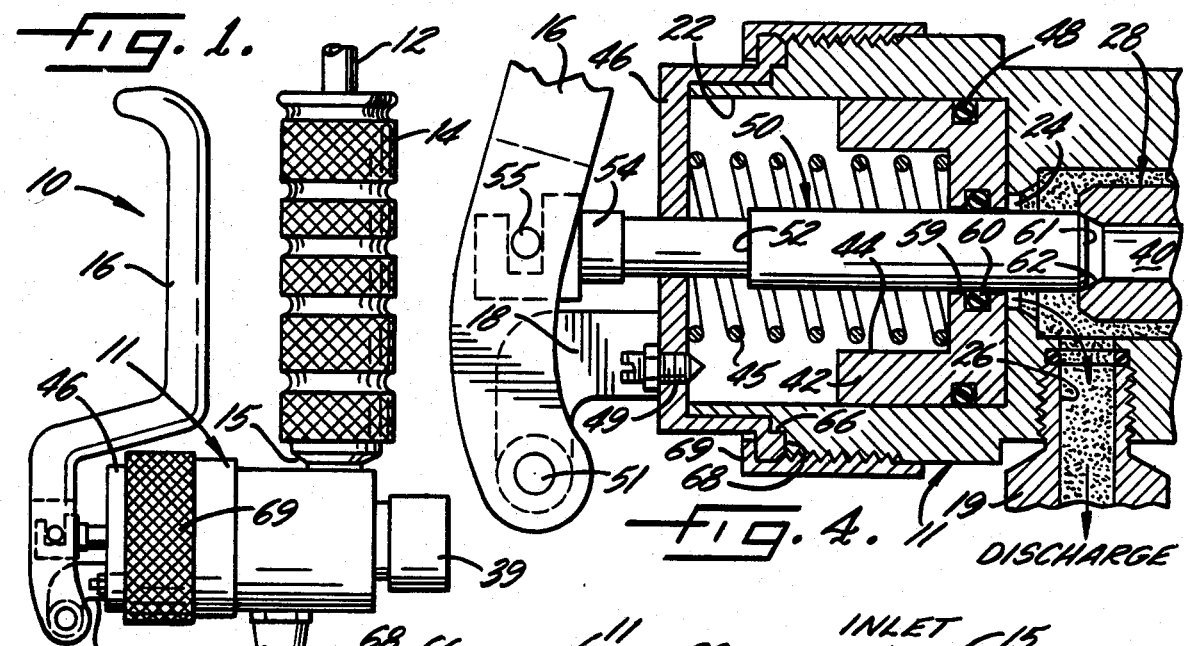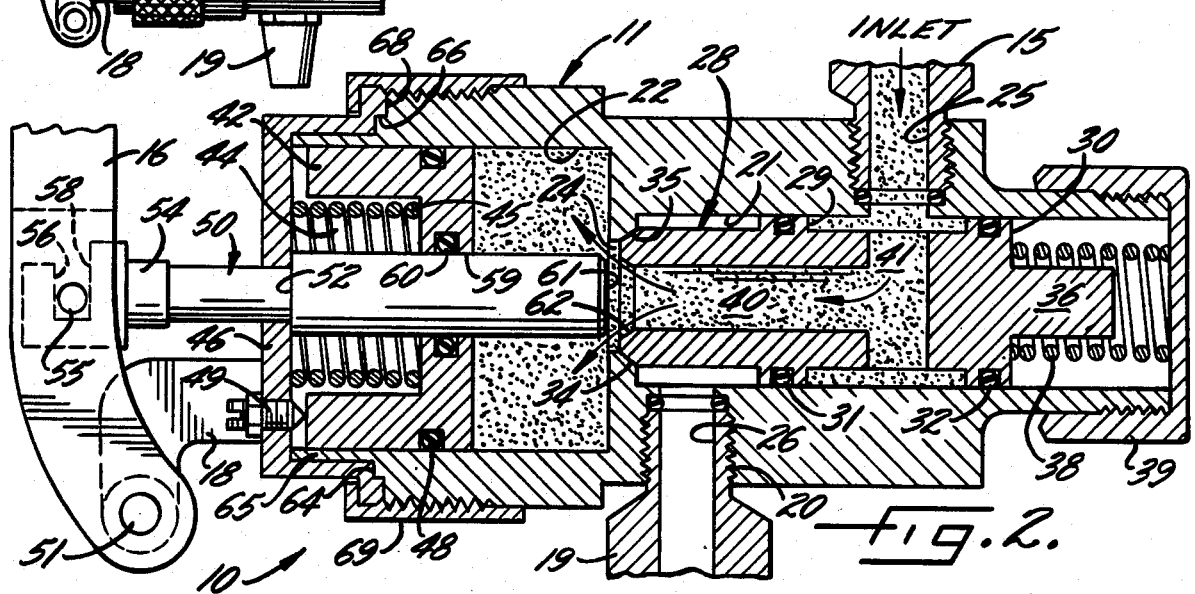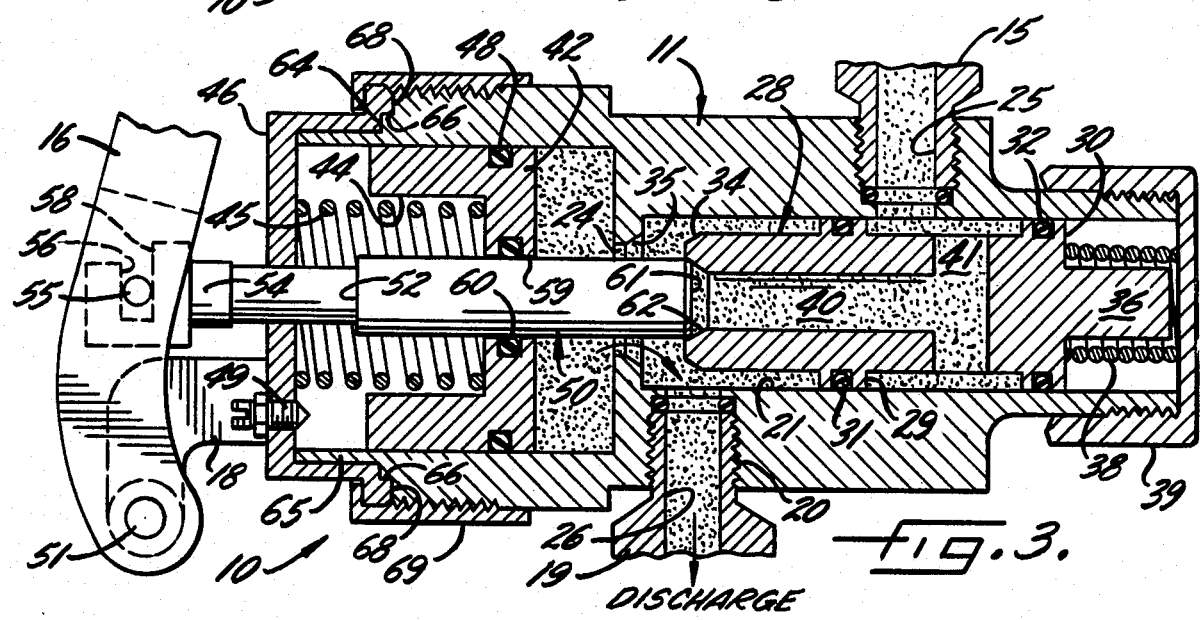

LIQUID DISPENSING GUN

BACKGROUND OF THE INVENTION

The present invention relates to the field of devices for dispensing a predetermined quantity of liquid from a pressurized source in response to each actuation of the device. It finds particular, but not exclusive, utility for dispensing viscous liquids such as ketchup. The device lends itself to advantageous use in fast food operations where careful quantity control of the dispensed liquid is important to the quality of the product and the economics of the operation.

A wide variety of devices for dispensing measured quanities of liquid have been devised heretofore. Such prior devices have numerous shortcomings, including complexity, expense, difficulty in dismantling for cleaning purposes, imprecise measuring of liquid dispensed, or difficulty in handling liquid from a pressurized source.

SUMMARY OF THE INVENTION

One object of the present invention is to provide a gun for repeatedly and reliably dispensing precisely metered quantities of liquid from a pressurized source in a high production operation.

Another object of the invention is to provide a dispensing gun of the type set-forth above adapted to be manually actuated with precision by application of fingertip forces. A related object is to provide a dispensing gun of the foregoing nature which is adapted to be operated under power as well as manual means.

A further object is to provide a dispensing gun of the above type which is of simple, compact construction and capable of quick disassembly for cleaning and quick reassembly after cleaning.

Another object of the invention is to provide a dispensing gun of the above character capable of handling pressurized liquid without leakage.

The foregoing objectives are accomplished by the present invention through a remarkably simple and efficient dispensing gun adapted to operate from a pressurized source of viscous liquid. The gun comprises a hollow body having a valve chamber with an inlet and an outlet port and a metering chamber connected to the valve chamber by a control orifice; and axially slidable valve spool in the valve chamber resiliently biased into engagement with the control orifice; a metering piston in the metering cylinder resiliently biased toward the control orifice; and a trigger operated actuating plunger adapted to shift the valve spool between a first position for loading the metering chamber with pressurized liquid and overcoming the metering piston biasing means while the outlet port is blocked, and a second position for discharging a metered quantity of liquid from the metering chamber through the control orifice while the outlet port is open and the inlet port is blocked.

BRIEF DESCRIPTION OF THE DRAWINGS

FIG. 1 is a side elevational view of an illustrative liquid dispensing gun exemplifying the present invention.

FIG. 2 is an enlarged fragmentary sectional view taken axially through the body of the dispensing gun shown in FIG. 1 with the parts in the intake position.

FIG. 3 is an enlarged fragmentary sectional view similar to FIG. 2 but with the dispensing gun in process of discharging liquid from the metering cylinder.

FIG. 4 is an enlarged fragmentary sectional view similar to FIG. 2 but with the metering cylinder in the fully discharged condition.

While the invention is susceptible of various modifications and alternative constructions, a certain illustrative embodiment has been shown in the drawings and will be described below in considerable detail. It should be understood, however, that there is no intention to limit the invention to the specific form disclosed, but, on the contrary, the intention is to cover all modifications, alternative constructions, and equivalents falling within the scope of the appended claims.

DETAILED DESCRIPTION OF THE INVENTION

Referring more specifically to FIGS. 1-4, the present invention is there exemplified in a dispensing gun 10 adapted when actuated by manual or power means to dispense precisely metered quantitites of liquid. The gun 10 comprises a hollow body 11 connected to a pressurized supply line 12 which in this instance contains ketchup. The supply line 12 passes through a handle 14 attached to the body and terminates in a supply line fitting 15 threadedly connected to the body. An acutating trigger 16 is pivotally attached to a support bracket 18 fixed to one end of the body. Fluid is discharged from an outlet nozzle 19 threadedly attached to the body by nozzle fitting 20. Each time the trigger 16 is squeezed toward the handle 14, a precisely metered quantity of ketchup is discharged from the gun 10. Upon release of the trigger, the gun promptly reloads for the next discharge.

In order to provide for the intake and discharge of liquid to and from the dispensing gun 10, the body 11 is formed with a valve chamber 21 and a metering chamber 22. The chambers 21 and 22 are axially aligned and connected by a control orifice 24. Adjacent the end of the body remote from the control orifice, the valve chamber is formed with an inlet port 25 which communicates with the supply line fitting 15 and the pressurized liquid supply. Between the inlet port 25 and the control orifice 24, the valve chamber is formed with an outlet port 26 communicating with nozzle 19 and its fitting 20.

In accordance with the invention, a resiliently biased valve spool 28 is mounted for axial sliding movement within the valve chamber to regulate the flow of liquid from the inlet port into the metering chamber, and from the metering chamber to the outlet port. The valve spool 28 has a first operative position establishing communication between the inlet port 25 and the metering chamber 22 while blocking the outlet port 26. The valve spool has a second operative position establishing communication between the metering chamber 22 and the outlet port 26 while blocking the inlet port 25.

Referring in greater detail to the valve spool 28, it will be noted that the latter is formed intermediate its ends with a pair of axially spaced lands 29, 30 each of somewhat larger diameter than the remainder of the spool. Each land in this case has an annular groove which houses a respective one of O-rings 31, 32 formed of resilient sealing material. The land 29 and its O-ring 31 serve as a movable seal isolating the inlet port 25 from the outlet port 26. The land 30 and its O-ring 32 serve as a movable seal preventing leakage of pressurized liquid from the inlet port 25 to the end of the valve chamber remote from the control orifice 24. The end of the valve spool 28 facing the metering chamber 22 is formed with a taper 34 adapted to sealingly engage a mating seat 35 on the control orifice 24. At its opposite end, the valve spool has an axial stem 36 of reduced diameter which is surrounded by a resilient biasing means in the form of a spiral spring 38. The spring 38 bears against a cap 39 threaded on one end of the body 11 and an annular shoulder on the valve spool surrounding the stem 36. By reason of this construction, the valve spool 28 is biased into engagement with the control orifice 24.

Provision is made for injecting liquid from the pressurized source into the metering chamber 22 via the valve spool 28. The spool 28 is thus formed with an axial passage 40 open at the downstream end which faces the metering chamber and connected at its upstream end with a radial passage 41 which communicates directly with the inlet port 25. When the trigger 16 is in its non-actuated position, the downstream end of the axial passage 40 is open and pressurized liquid flows from the supply line 12 through fitting 15, inlet port 25, passages 41, 40 and into the metering chamber 22 (FIG. 2).

For the purpose of metering the liquid injected into the metering chamber 22 by the valve spool 28, a metering piston 42 is slidably housed within the chamber 22. The piston 42 is of cup-shaped form, defining an annular recess 44 in the face remote from the control orifice 24. The recess 44 houses a resilient biasing means in the form of a spiral spring 45. The latter is interposed between the bottom end of the recess 44 and a cap 46 fixed to the end of the body 11 adjacent to the trigger 16. The outer periphery of the piston 42 has a groove accommodating an O-ring 48 which defines a sliding seal with the wall of the metering chamber 22. The characteristic of the spring 45 of the metering piston is such that it is adapted to yield against the force of an incoming charge of liquid from the valve spool passage 40. When the incoming liquid charge is cut off and the metering chamber is connected to the outlet, the spring 45 is adapted to drive the metering piston 42 toward the control orifice and against the opposed end wall of the metering chamber to expel the charge of liquid via the outlet port 26.

The volume of liquid delivered by the gun 10 may be selectively varied by means of an adjustment stop 49 adapted to alter the stroke of the metering piston within close tolerances. In the present instance, the stop 49 comprises a screw mounted in a tapped hole in the end wall of the cap 46 and an associated lock nut. The stop 49 is positioned so as to engage the annular end face of the piston surrounding the biasing spring 45 and thereby regulate the piston stroke.

As indicated earlier herein, the gun 10 is actuated by means of trigger 16 to discharge a precisely measured quantity of liquid from the nozzle 19. The gun thus includes an actuating plunger 50 constrained for axial sliding movement within the body 11 and operatively connected to an intermediate portion of the trigger 16 spaced radially from its pivot 51 on bracket 18. The main body portion of the plunger 50 has a length equal to or slightly shorter than the length of the metering chamber. A portion of reduced diameter, defining a shoulder 52 with the main body portion, is slidably mounted relative to an aperture in the end wall of cap 46. The reduced diameter portion connects the actuating plunger 50 to the trigger 16 by means of an appropriate coupling 54 engageable by a pin 55 on the trigger.

In order to accommodate the straight line or axial motion of the plunger 50 to the arcuate motion of the trigger 16 about its pivot 51, the coupling 54 is fashioned in a general U-shape, defining two spaced apart slide surfaces 56, 58. Accordingly, when the trigger is actuated the radial thrust of the trigger pin 55 will be accompanied by relative linear movement of the pin along one or the other of slide surfaces 56, 58 depending upon the direction in which the trigger is moved about its own pivot 51.

To receive the main portion of the actuating plunger 50, the metering piston 42 has a central bore 59 with a sliding seal in the form of an O-ring 60. The projecting inner end of the actuating plunger 50 has a chamfer 61 adapted to enter into sealing engagement with a seat 62 at the mouth of the axial bore 40 of the valve spool.

To maintain the orientation of the trigger 16 parallel to the handle 14, appropriate registration means are provided between the spring cap 46 and the body 11 (FIGS. 2–4). In this instance, the body is formed with a shoulder 64 between the skirt 65 defining the outer end portion of the metering chamber and the outer end of the threads surrounding the metering chamber. At least one pair of diametrically opposed flats 66 is formed in the shoulder 64. The spring cover or cap 46 is fashioned with a corresponding pair of diametrically opposed, axially extending, segmental lugs 68. When the cap 46 is telescoped over the metering chamber skirt 65, the lugs 68 on the cap register with the flats 66 in the shoulder 64, thereby orienting the cap 46 and thus the trigger 16 with respect to the body and the handle 14. Tightening of the clamp ring 69 thereby retains the trigger 16 in properly oriented position.

The operation of the gun 10 will become more apparent in light of the foregoing description. Starting with the trigger 16 in the rest position shown in FIGS. 1 and 2, the tapered end 34 of the valve spool 28 is seated in the control orifice 24 and the actuating plunger 50 is in its retracted position. Under this condition, shown in FIG. 2, pressurized liquid from the supply line 12 enters the inlet port and passages 41, 40 of the valve spool, filling the void space in the metering chamber between the face of the metering piston 42 and the end wall of the metering chamber surrounding the control orifice. At this time, the outlet port 26 is completely blocked by the valve spool 28. Upon squeezing the trigger 16 against the handle 14, the actuating plunger 50 moves axially from the position shown in FIG. 2 to that shown in FIG. 3. As an incident to such movement, the projecting end of the actuating plunger engages the seat 62 at the end of the valve spool passage 40, precluding entry of additional liquid through the inlet port. At the same time, such action also forces the valve spool 28 to the right, compressing its biasing spring 38 and establishing communication with the outlet port 26 via the control orifice 24. This relieves the back pressure on the liquid within the metering chamber and the metering piston 42 thus moves toward the control orifice under the force of its biasing spring 45. Such motion continues, passing from the condition illustrated in FIG. 3 to that shown in FIG. 4 where the metering piston 42 has emptied the metering chamber of its precise quanity of liquid and has brought its face into abutment with the inner end wall of the metering chamber.

Upon release of the trigger 16 following discharge of the metered quantity of liquid, the valve spool 28 and the actuating plunger 50 will be driven in unison to the left by the biasing spring 38 until the tapered end 34 of the valve spool engages the mating seat of the control orifice 24, as shown in FIG. 2. Since this cuts off communication with the outlet port, liquid pressure from the supply line bears against the projecting end of the actuating plunger, forcing it to the left until the shoulder 52 at the end of the enlarged portion engages the inner face of the cap 46, also as shown in FIG. 2. This establishes communication of pressurized liquid between the valve spool passage 40 and the metering chamber via the control orifice, forcing the metering piston to the left against the biasing spring and refilling the metering chamber. At that point, the gun is ready for another cycle.

Since the embodiment of the present invention described above is utilized in the food industry, sanitation is an important consideration. The construction of the gun 10 lends itself well to quick disassembly for cleaning. The end caps 39, and 46, being threadedly attached to the body 11, may readily be removed. This permits easy removal of the valve spool 28 and its biasing spring. Upon removal of the end cap 46 and disconnection of the pivotal fitting on the actuating plunger from the trigger, the metering piston 42, its biasing spring 45, and the actuating plunger may readily be removed from the metering chamber. The O-ring type liquid seals on the valve spool and metering piston lend themselves to easy removal for cleaning. Following the cleaning operation, the parts of the gun may be quickly and easily reassembled to restore the gun to service.

I claim as my invention:

1. A gun for repeatedly dispensing precisely metered quantities of liquid from a pressurized source, said gun comprising, in combination:
   (a) a hollow body having a valve chamber, a metering chamber, and a control orifice;
   (b) a metering piston in said metering chamber resiliently biased toward said control orifice;
   (c) said valve chamber having an inlet port connected to a pressurized liquid source and an outlet port connected to a discharge nozzle;
   (d) an axially slidable valve spool in said valve chamber, said valve spool being formed with a liquid passageway;
   (e) said valve spool having a first operative position within said valve chamber in which it engages said control orifice and blocks communication between said metering chamber and said outlet port while permitting the flow of pressurized liquid from said inlet port through said spool passageway into said metering chamber against the resilient biasing means of said metering piston; and
   (f) actuating means for shifting said valve spool and simultaneously blocking said spool passageway, said actuating means comprising an actuating plunger adapted for engaging and shifting said valve spool from said first operative position to a second operative position in which said valve spool is disengaged from said control orifice to permit communication between said metering chamber and said outlet port to discharge a metered quantity of liquid through said outlet port while communication between said inlet port and metering chamber through said spool passageway simultaneously is blocked.

2. The combination set forth in claim 1, wherein said valve spool liquid passageway communicates between said inlet port and an end of said valve spool facing said control orifice.

3. The combination set forth in claim 2, wherein said valve spool is formed with a seal blocking communication between said inlet port and said outlet port.

4. The combination recited in claim 2 in which said valve spool has a pair of axially spaced lands disposed in sealing engagement with said valve chamber and bracketing said inlet port.

5. The combination recited in claim 2, wherein said end of said valve spool facing said control orifice is contoured for entering into complemental engagement therewith.

6. The combination set forth in claim 2, wherein said actuating plunger has an end facing said control orifice that is contoured for complemental engagement with said valve spool to block said spool passage.

7. The combination set forth in claim 6, wherein said actuating plunger is substantially smaller in diameter than said control orifice, thereby allowing communication between said metering chamber and said outlet port of said valve chamber.

8. The combination recited in claim 1, which further comprises a trigger pivotally attached to said body at a point offset from the axis of said actuating plunger; and a pivotal connection between said trigger and said actuating plunger for driving the latter into engagement with said valve spool when said trigger is pivoted toward said body.

9. The combination set forth in claim 8, wherein said actuating plunger is constrained to move axially, and said pivotal connection between said trigger and said actuating plunger includes sliding movement as well as pivotal movement.

10. The combination set forth in claim 1, which further comprises means in said metering chamber for adjusting the stroke of said metering piston and thereby to adjust the volume delivered by the latter.

11. A gun for dispensing metered quantities of liquid from a pressurized source and comprising, in combination:
   (a) a hollow body having a metering chamber and a valve chamber, said metering chamber and valve chamber being disposed on opposite sides of a control orifice connecting said chambers;
   (b) said valve chamber having an inlet port connected to a pressurized liquid source and an outlet port;
   (c) a metering piston slidably disposed in said metering chamber;
   (d) a first resilient means biasing said metering piston toward said control orifice;
   (e) valve means moveably disposed in said valve chamber, said valve means being formed with a liquid passageway and having a first operative position in said valve chamber in which said valve means engages said control orifice and establishes communication between said inlet port and said metering chamber through said valve means passageway while blocking communication between said metering chamber and said outlet port;
   (f) a second resilient means biasing said valve means toward said first operative position; and
   (g) actuating means adapted for (1) engaging and shifting said valve means against the thrust of said second resilient biasing means to a second operative position in which said valve means is disengaged from said control orifice for establishing communication between said metering chamber and said outlet port and (2) simultaneously blocking communication between said inlet port and metering chamber through said valve means passageway.

12. The combination recited in claim 11, which further comprises a trigger having a first pivotal connection to said body and a second pivotal connection to said actuating means radially offset for said first pivotal connection.

13. A gun for dispensing metered quantities of liquid ketchup from a pressurized source and comprising in combination:
  (a) a hollow body having a valve chamber and a metering chamber connected by a control orifice;
  (b) said body having an inlet port and an outlet port communicating with said valve chamber;
  (c) a valve spool slidably disposed in said valve chamber and having an axial passage communicating between one end thereof and the outer periphery of a medial portion thereof;
  (d) sealing means on said valve spool interposed between said inlet and said outlet;
  (e) resilient means biasing said valve spool into engagement with said control orifice;
  (f) a metering piston slidably disposed in said metering chamber;
  (g) resilient means biasing said metering piston toward said valve chamber;
  (h) an axially slidable actuating plunger disposed in opposition to said valve spool and adapted to open and close the axial passage thereof; and
  (i) a trigger pivotally mounted on said body and adapted when squeezed toward the latter to drive said actuating plunger into engagement with said valve spool and to move said valve spool away from said control orifice for effecting closure of the axial passage of said valve spool and opening of said control orifice to permit communication between said metering chamber and said valve chamber outlet port.

14. A gun for dispensing metered quantities of liquid from a pressurized source and comprising, in combination:
  (a) a hollow body having a metering chamber and a valve chamber, said metering chamber and valve chamber being disposed on opposite sides of a control orifice communicating between said chambers;
  (c) a metering piston slidably disposed in said metering chamber;
  (d) a first resilient means biasing said metering piston toward said valve chamber;
  (e) a closure cap attached to said body enclosing said metering chamber and said first resilient biasing means;
  (f) means in said valve chamber being movable to a first operative position in which it engages said control orifice and establishes communication between said inlet port and said metering chamber while blocking communication between said metering chamber and said outlet port;
  (g) said valve means being movable to a second operative position in which it is disengaged from said control orifice and establishes communication between said metering chamber and said outlet port while blocking said inlet port;
  (h) means for blocking communication between said inlet port and said metering chamber during movement of said valve means from said first position to said second position;
  (i) a second resilient means biasing said valve means toward said first operative position; and
  (j) an axially slidable actuating plunger extending through said closure cap and adapted to shift said valve means from said first operative position to said second operative position against the thrust of said second resilient biasing means;
  (k) a trigger pivotably mounted on said closure cap at a point offset from the axis of said actuating plunger;
  (l) a pivotal connection between said trigger and said actuating plunger for driving the latter into engagement with said valve means when said trigger is pivoted toward said body; and
  (m) registration means interposed between said closure cap and said body to maintain the orientation of said trigger relative to said body.

15. The combination set forth in claim 14, wherein said registration means comprises a pair of diametrically opposed, axially extending lugs on said closure cap and a mating pair of diametrically opposed flats on said body 16. A gun for repeatedly dispensing precisely metered quantities of liquid from a pressurized source, said gun comprising, in combination:
  (a) a hollow body having a valve chamber and a metering chamber connected by a control orifice;
  (b) a metering piston in said metering chamber resiliently biased toward said control orifice;
  (c) said valve chamber having an inlet port connected to a pressurized liquid source and an outlet port connected to a discharge nozzle;
  (d) an axially slidable and resiliently biased valve spool in said chamber, said valve spool having a passage communicating between said inlet port and an end of said valve spool facing said control orifice;
  (e) said valve spool having a first operative position in which it engages said control orifice and blocks said outlet port while permitting the flow of pressurized liquid from said inlet port through said valve spool passage and into said metering chamber against the resilient biasing means of said metering piston; and
  (f) actuating means for shifting said valve spool and simultaneously blocking said spool passageway, said actuating means comprising an actuating plunger adapted for engaging and shifting said valve spool from said first operative position to a second operative position in which it is disengaged from said control orifice so as to permit communication between said metering chamber and said outlet port and the discharge of a metered quantity of liquid through the outlet port while blocking communication between said inlet port and metering chamber through said valve spool passage.

17. The combination set forth in claim 16 in which said actuating plunger is operable for blocking communciation between said inlet port and said metering chamber as an incident to shifting said valve spool from said first position to said second position.

18. The combination set forth in claim 16 in which said plunger is shifted into engagement with said valve spool passage as an incident to shifting said valve spool from said first position to said second position.

19. A gun for dispensing metered quantities of liquid from a pressurized source and comprising, in combination:
(a) a hollow body having a metering chamber and a valve chamber communicating therewith;
(b) said valve chamber having an inlet port connected to the pressurized liquid source and an outlet port;
(c) a metering piston slidably disposed in said metering chamber;
(d) a first resilient means biasing said metering piston toward said valve chamber;
(e) valve means in the form of a generally spool shaped body slidably disposed in said valve chamber, means defining an axial passage in said valve body that is open at one end thereof, a pair of axially spaced lands on said valve body intermediate the ends thereof, and means defining a radial passage in said valve body between said lands and communicating with said axial passage therein;
(f) said valve means having a first operative position in said valve chamber establishing communication through said radial and axial passages between said inlet port and said metering chamber while blocking communication between said metering chamber and said outlet port;
(g) a second resilient means biasing said valve means toward said first operative position; and
(h) actuating means adapted to (1) shift said valve means against the thrust of said second resilient biasing means from said first operative position to a second operative position for establishing communication between said metering chamber and said outlet port and (2) simultaneously block communication between said inlet port and metering chamber through said valve body axial passage.

* * * * *